US008681828B2

(12) United States Patent
Benner, Jr.

(10) Patent No.: US 8,681,828 B2
(45) Date of Patent: Mar. 25, 2014

(54) LASER PROJECTION SYSTEM AND SAFETY LENS FOR AUDIENCE SCANNING

(76) Inventor: William R. Benner, Jr., Longwood, FL (US)

( * ) Notice: Subject to any disclaimer, the term of this patent is extended or adjusted under 35 U.S.C. 154(b) by 735 days.

(21) Appl. No.: 12/791,326

(22) Filed: Jun. 1, 2010

(65) Prior Publication Data

US 2010/0302611 A1 Dec. 2, 2010

Related U.S. Application Data

(63) Continuation-in-part of application No. 11/814,310, filed as application No. PCT/US2006/001988 on Jan. 9, 2006, now Pat. No. 7,756,174.

(60) Provisional application No. 61/324,014, filed on Apr. 14, 2010.

(51) Int. Cl.
*H01S 3/10* (2006.01)
*G02B 3/02* (2006.01)
*G02B 13/18* (2006.01)

(52) U.S. Cl.
USPC .......... 372/24; 372/101; 359/719; 359/207.3; 359/207.5

(58) Field of Classification Search
USPC ............... 359/719, 207.3, 207.5; 372/24, 101
See application file for complete search history.

(56) References Cited

U.S. PATENT DOCUMENTS

| | | |
|---|---|---|
| 4,006,970 A | 2/1977 | Slater et al. |
| 4,666,446 A * | 5/1987 | Koziol et al. ............... 623/6.33 |
| 5,130,838 A | 7/1992 | Tanaka et al. |
| 5,546,139 A | 8/1996 | Bacs, Jr. et al. |
| 5,621,561 A * | 4/1997 | Belfatto et al. ............ 359/205.1 |
| 5,774,174 A * | 6/1998 | Hardie ............................. 348/38 |
| 6,580,560 B1 | 6/2003 | Benner, Jr. |
| 6,661,820 B1 | 12/2003 | Camilleri et al. |
| 6,831,763 B2 * | 12/2004 | Takakubo ................. 359/207.2 |
| 6,867,753 B2 | 3/2005 | Chinthammit et al. |
| 6,919,892 B1 | 7/2005 | Cheiky et al. |
| 7,190,329 B2 | 3/2007 | Lewis et al. |
| 7,301,558 B2 | 11/2007 | Gluck |
| 2005/0024704 A1* | 2/2005 | Sakai ........................... 359/212 |

(Continued)

FOREIGN PATENT DOCUMENTS

JP 2000194302 7/2000

OTHER PUBLICATIONS

Murphy et al., "Scanning Audiences at Laser Shows: Theory, Practice and a Proposal", Feb. 20, 2009, International Laser Display Association, 1-21.*

(Continued)

*Primary Examiner* — Jessica Stultz
*Assistant Examiner* — Joshua King
(74) *Attorney, Agent, or Firm* — Allen, Dyer, Doppelt, Milbrath & Gilchrist, P.A.

(57) ABSTRACT

A laser light projector includes a laser beam generated by a laser light source, a scanner associated with the laser light source and having one or more moving mirrors capable of scanning the laser beam along X-Y coordinates, a scan-fail monitor and a safety-lens. The safety-lens includes a plurality of powers arranged for increasing the safety of the projected light within audience areas by increasing beam divergence in the audience, while keeping beam divergence low above the heads of the audience, thus allowing mirror targeting to occur.

24 Claims, 2 Drawing Sheets

(56) References Cited

U.S. PATENT DOCUMENTS

| | | | |
|---|---|---|---|
| 2006/0139319 A1 | 6/2006 | Kariathungal et al. | |
| 2006/0139718 A1* | 6/2006 | Ishihara | 359/205 |
| 2007/0279494 A1 | 12/2007 | Aman et al. | |
| 2008/0123708 A1* | 5/2008 | Benner | 372/38.09 |
| 2011/0279880 A1* | 11/2011 | Benner et al. | 359/205.1 |

OTHER PUBLICATIONS

Benner, Jr., William R., "New Tools for Eye-Safe Measurements,"; The Laserist, vol. 8, No. 2, pp. 11 and 14; Spring 1997.

Benner, Jr. William R., "Tools to Keep Audience Scanning Safe,"; The Laserist, vol. 8, No. 3, pp. 11-13; Summer 1997.

Benner, Jr., William R., "Evaluating Audience Scanning Effects,"; The Laserist, vol. 8, No. 4, pp. 8-9; Fall 1997.

Benner, Jr., William R., "Laserists Tackle Scanning Safety Issue," The Laserist, vol. 9, No. 4, pp. 5 and 18; Winter 1998.

Benner, Jr., William R., "Making Shows Safe and Enjoyable,"; Internet article; published in 1997, [online], Retrieved from the ILDA Technology website using Internet ,<URL:http://www.laserist.org/ilda/showsafe.shtml>.

O'Hagan, "A Risk Assessment Methodology for the Use of Lasers in the Entertainment Industry", John B. O'Hagan, Doctoral Thesis, 47-77.

* cited by examiner

LASER PROJECTION SYSTEM AND SAFETY LENS FOR AUDIENCE SCANNING

CROSS-REFERENCE TO RELATED APPLICATIONS

This application claims priority to U.S. Provisional Patent Application Ser. No. 61/324,014 for "Laser Projector and Safety Lens for Audience Scanning" having filing date Apr. 14, 2010, and is a continuation-in-part application of and claims priority to U.S. utility patent application Ser. No. 11/814,310 for "Laser Projector for Audience Scanning" having filing date Jul. 19, 2006 filed in a National Phase Entry from Patent Cooperation Treaty Application PCT/US2006/001988 having filing date Jan. 9, 2006, the disclosures of which are herein incorporated by reference in their entirety, and all are commonly owned.

FIELD OF THE INVENTION

The present invention generally relates to the field of laser projectors, and more particularly to a laser projector for safely projecting patterns and arrays of laser beams directly into an audience for entertainment display purposes.

BACKGROUND

Projectors for laser display can generally be categorized into one of three groups including graphics projectors, beam projectors, and audience scanning projectors.

Graphics projectors are typically those which project logos, text and other figures onto some projection surface such as a screen. To create images, these projectors employ an X-Y scanning system, usually including two small mirrors mounted on galvanometer scanners. One mirror scans the beam in one linear direction (for example, horizontally) onto the second mirror, which scans the beam in the perpendicular direction (for example, vertically). The combined X-Y motion is normally used to draw outline-type vector images, using a point-by-point "connect the dots" styled method, according to software commands from a programmable controller operably connected with the laser projector. The audience views these figures on the screen in the same way that an audience would view a movie being projected onto a screen.

A beam projector produces beams of light that are projected into mid-air. The beams are viewable in mid-air by virtue of fog, dust and moisture that either exists in the air or which is created by a performer or venue. The beams are often animated to produce a dynamic effect. The beams can be moved and animated in a number of ways. As described by way of example for embodiments of the invention, an X-Y scanning system is also used. The scanning system may be identical to that of graphics projectors (the projector is merely aimed into the air instead of at a screen), or the scanning system may scan more slowly than that of graphics projectors (since complex images may not be required). Use of an X-Y scanning system allows flexibility to create both simple placement of the beam to hit target mirrors or objects and also to allow more complex patterns such as circles and shapes to be projected.

With both graphics and beam projectors, the generated light, typically from a laser beam, does not come in contact with the audience. The light merely travels from the projector to its destination surface (in the case of graphics projectors), or along an uninterrupted path in mid air, and typically exclusively above the heads of the viewing audience (in the case of beam projectors).

Audience scanning projectors typically combine features of both graphics and beam projectors. Audience scanning projectors typically use X-Y scanners to project geometric figures, patterns and arrays of light beams directly into a viewing audience. As with beam projectors, when the laser is projected toward an audience, its beam also illuminates any fog, dust, and moisture in the air. The beams may create dancing sculptures that are very pleasing to audience members and the beam generally comes in direct contact with the audience. The generated effect creates an illusion of being surrounded by a tunnel of light and by other geometric shapes that are formed by the light. Such effects have been compared to being inside a fireworks display, or being at the bottom of a swimming pool filled with light. By way of example, one audience scanning projector, as known in the art, is described in the above referenced U.S. utility patent application Ser No. 11/814,310 for "Laser Projector for Audience Scanning" and herein incorporated by reference.

Audience scanning projectors are often placed at a height of 3 meters, which is above the heads of all audience members. This is because the typical program material (image file data and abstracts) projected by audience scanning projectors uses the concept of a "horizon" to create certain shapes. It is known by laser show programmers that audience members will not reside above the horizon, and thus, certain patterns, such as non-moving beams may be placed there which are known to be above the heads of those in the audience. Likewise, it is known that audience members will probably reside below the horizon, and therefore only sheets and cones and faster-moving patterns will typically be placed there.

In the case of each of the three projector types described above, the X-Y signals and beam power level signals are generated by a programmable controller which generally comprises a personal computer having suitable interface hardware, and running software for generating the images, patterns and shapes. The hardware generally includes an interface circuit board that connects to the computer. This interface circuit board includes digital-to-analog converters and voltage amplifiers, so that signals can be produced which correspond to X-Y beam positions, and to beam power levels. The X-Y beam positions and beam power levels produced by the interface hardware are sometimes referred to as "command signals," since these signals represent the software's intention for the projector to follow. The software program generates the X-Y beam positions and beam power level "command signals" and periodically transfers these as digital data to the digital-to-analog converters in the interface circuit board. Those skilled in the art know that any suitable interface hardware and software may be used to control any of the three projector types mentioned above. However, by way of example for embodiments of the present invention, hardware and software systems include the QuadMod™ series of hardware boards and Lasershow Designer™ series of laser software, both from Pangolin Laser Systems, Orlando, Fla.

When projecting a laser beam toward a viewer, eye safety is a major concern. If an intense laser beam were to stop scanning and stopped directly on the pupil of a viewer's eye, retinal damage can occur if the beam has sufficiently high power and a sufficiently long dwell time. Likewise, even if the beam is not stopped but is scanned across the pupil of an eye, it can still cause retinal damage if the beam power is high enough, or if the beam is scanning slowly enough.

In audience scanning projectors in the current state of the art, the X and Y beam position signals generated by the X-Y scanners are mathematically differentiated to produce an output equivalent to X and Y beam velocity. The X and Y beam velocities are added together to produce the total beam velocity. This total beam velocity is monitored and compared to some pre-set minimum allowable velocity to make sure that the beam velocity is sufficiently high. If the beam were to stop scanning, producing zero velocity, or if the velocity were to otherwise drop below some preset threshold, this would be considered a "scanning failure." Under a scanning failure condition, the beam may be completely turned off by the light beam modulator or by a shutter. This type of system is called a "scan-fail monitor". Note that a scan-fail monitor is most often implemented in the form of analog signal conditioning components, but may also be implemented with computer hardware and software. By way of further example, and with reference again to U.S. utility patent application Ser. No. 11/814,310 for "Laser Projector for Audience Scanning," a scan-fail monitor as know in the art is described.

While scan-fail monitors provide some level of protection for the audience, there are a number of problems that still remain. First, a scan-fail monitor does not provide automatic power level control in different regions of the scan field. For example, scan-fail monitors are not capable of allowing a higher power level over the audience's heads or below their eyes. Second, scan-fail monitors can be easily "fooled" into believing that there is a safe condition when there is not, because they typically only monitor the rate of change of position and do not track the actual position of the beam. For example, if the beam alternates between two fixed locations, thereby concentrating 50% of the beam power in each position, the scan-fail monitor may allow this condition since the beam is technically scanning. However, in many instances, a 50% concentration of beam power could be hazardous. Therefore, improvements are still needed over the use of a scan-fail monitor alone.

Referring again to the above referenced audience scanning projector of the current state of the art, a laser generates a beam of light which is modulated. The modulation is performed either directly by the laser power supply, or externally by a modulator such as an acousto-optic modulator. After being modulated, the beam is directed to X-Y vector scanners and then projected directly into the audience. A scan-fail monitor may be used to detect if the scanning has stopped, or slowed to an unacceptably low level. Aside from the laser, modulator, shutter and X-Y scanners, typically no additional optical elements are used.

In this configuration, it could be said that the "raw laser beam" is used directly to illuminate audience members. However, a typical laser used for laser display applications has a beam diameter of 2 millimeters and divergence of around 1 milliradian. With this small size beam and low divergence, it is very possible that, during the scanning action, the entire laser beam will be smaller than 7 millimeters (which is the internationally-agreed-upon pupil diameter used for the purposes of safety evaluation) within the audience. Because the laser beam diameter is typically so small in the audience, it means that no greater than around 5 milliwatts of laser power can be used to create the laser display, regardless of the sophistication of the scan-fail monitor. If a higher power is used, the display will not be able to meet Class 1 standards for laser safety.

Although it is not typically done, it is known to use a lens within the beam path of an audience scanning laser projector, such as a lens whose power has approximately a −1.0 diopter. The lens may be placed between the modulated laser beam and the X-Y scanners, or immediately at the exit of the scanners. A lens whose power is negative will increase the divergence of the laser beam so that the beam diameter will be greater than 7 millimeters within the audience. When the beam is greater than 7 millimeters, the entire beam will no longer fit through the pupil of a viewer's eye and thus, not all of the laser beam's power will be delivered to the retina if the laser beam does land on someone's eye.

Light irradiance (which is the power per unit area) is governed by the "inverse square law", which states that, for a given beam power, if you double the beam diameter, the power-per-unit-area will be decreased by a factor of four. Thus the power-per-unit area decreases by the inverse-square of beam diameter. Since the irradiance of the laser beam has the greatest implication to laser safety, it can be shown that decreasing the irradiance by increasing divergence is one effective means of increasing the safety of audience scanning projectors.

By using a lens with negative optical power to increase the divergence, this will decrease the power-per-unit area (irradiance) of the laser beam, thus making it possible to use a laser with higher than 5 milliwatts laser power, and still meet Class 1 standards for laser safety. In fact, by using a lens whose power is −1.0 diopters, the laser beam power can be increased to around 250 milliwatts for a typical size audience and a typical distance from the laser projector.

The increased divergence allows for a higher power laser to be used—thus, this generally provides a much more dramatic and stunning laser light show. However, this approach is also not without problems. Placing a lens with negative optical power before or after the scanners will decrease the divergence in all parts of the scan field, including above the heads of audience members. As stated above, laser projectors may be used for mirror targeting applications where the laser beam is directed to a mirror, to create a static beam sculpture. Typically a small beam is used for mirror targeting. The larger beam diameter caused by the lens makes such beam targeting virtually impossible. Another drawback is that, as the beam diameter is increased, the projected effect looks more cloudy and foggy, whereas the raw beam projected from the laser makes it look as though the light is cutting through the air like a knife.

It is also useful to have the lens located on a mounting arrangement external to the projector, so that if needed, the lens can be changed. However, an external mounting arrangement can also be tampered with. For example, if the laser projector is installed in a disco or night club, a rogue club operator or DJ might be tempted to completely remove the lens, thus allowing more intense and low-divergence beams to be projected everywhere, including into the audience. However, as noted above, low divergence beams projected into the audience would be potentially hazardous, especially if the power of the laser is greater than 5 milliwatts.

SUMMARY

The present invention overcomes drawbacks of known projectors by allowing the projection of laser beams with a small diameter and low divergence above the heads of the audience to aid in mirror targeting applications, while allowing the projection of laser beams with larger diameter and higher divergence within the audience, thus increasing safety.

Embodiments of the present invention, herein presented by way of example, increase the safety of the laser projector by making it so that if an external lens is removed, the laser projector will project high divergence beams everywhere and thus, the removal of the lens becomes a fail-safe arrangement, and also an arrangement which removes the motivation of rogue club operators and DJs to remove the external lens.

With the foregoing in mind, the present invention discloses a safe audience scanning projector that incorporates a laser, X-Y scanners, a scan-fail monitor and a safety lens. The safety lens may include at least two separate optical powers (curvatures)—one optical power for laser beams scanned above a horizon, and a separate optical power for laser beams scanned below the horizon. There may be an abrupt change between the optical powers, or there may be a transition region which tends to blend the optical powers. Moreover, one optical power may be effectively nearly zero, thus making that portion of the lens essentially function like a flat window. The safety lens may be the only lens used in the projector, placed at the exit of the X-Y scanners, or the safety lens may be used along with an additional lens placed before the X-Y scanners. By way of example, the present invention may be embodied in a system comprising a laser producing a beam of light, a scanner operable with the laser producing a scanned light beam, and a safety lens receiving the scanned light beam. The safety lens may comprise at least two optical powers. One optical power may project a first beam with lower divergence than a second optical power projecting a second beam. The one optical power may be more positive than the second optical power.

Further, the system may comprise a scan-fail monitor operable with the scanner for emitting a fault signal to the laser for reducing intensity of the beam of light coming from the laser to a level acceptable during a fault condition. The safety lens may have a plurality of optical power regions separated by at least one of a sharp split and a generally smooth transition between the optical power regions. The scanner may be an X-Y Galvanometer-based optical scanner directing the light beam along X-Y vector coordinates.

Yet further, the system may comprise a modifying lens receiving the light beam from the laser. The modifying lens may have a negative optical power and at least a portion of the safety lens having a positive optical power. At least a portion of the safety lens may have a negative optical power. An effective optical power of the safety lens may be about 0 diopters at a first portion and the effective optical power of the safety lens may be about negative 2 diopters at a second portion thereof.

First and second zones may be positioned for receiving the scanned light beam, wherein the first zone is defined above a viewing audience area and the second zone is defined to be within the viewing audience area, and wherein the scanned light beam emitted from the first portion of the safety lens is directed to the first zone and the portion of the scanned light beam emitted from the second portion of the safety lens is directed to the second zone.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF EMBODIMENTS

The present invention will now be described more fully hereinafter with reference to the accompanying drawings, in which embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

Figure 1:
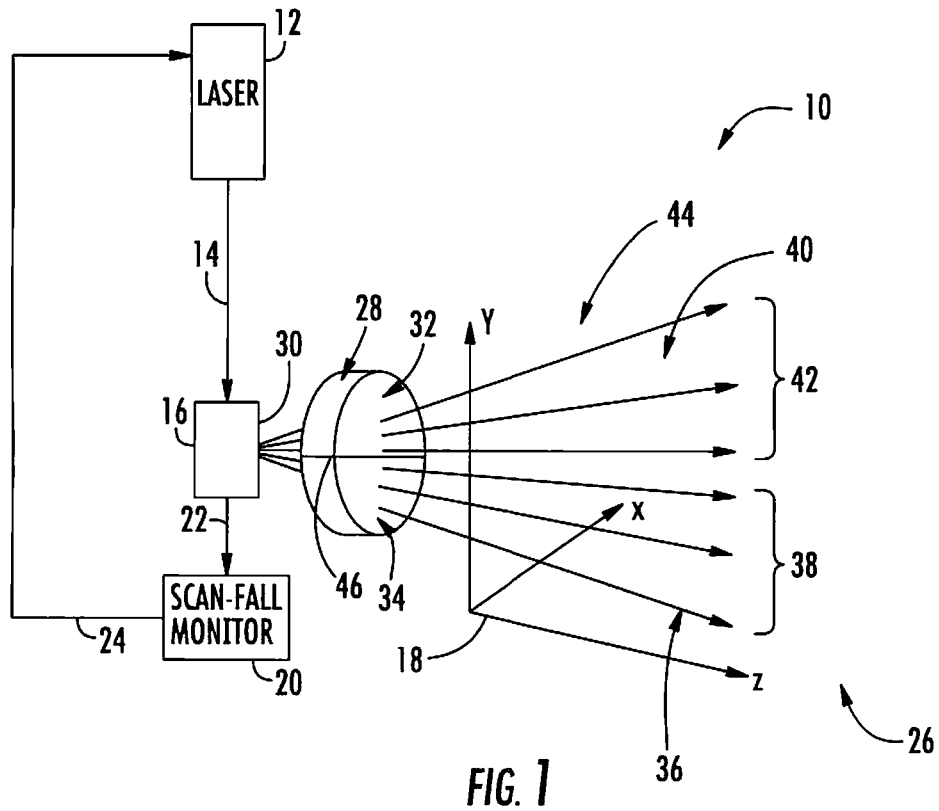
FIG. 1 is a diagrammatical illustration of a laser beam projection system for scanning an audience, according to one possible embodiment of the present invention.

With reference to FIG. 1, one embodiment of the invention is herein described by way of example as a laser projection system 10, wherein a laser 12 generates a light beam 14, which is directed to a scanner 16. The scanner 16 may have one or more moving mirrors capable of scanning the light beam 14 along X-Y coordinates 18. A scan-fail monitor 20 receives an output signal 22 from the scanner 16, the output being indicative of a scanner coordinate position and/or velocity. The scan fail monitor 20 performs a calculation on the scanner output signal 22, and in turn outputs a fault signal 24 if the position and/or velocity of the scanner 16 would lead to a hazardous condition, such as the scanning action being too slow or stopping within an audience area 26. The fault signal 24 reduces the power of the laser 12 to a light level that would be safe under a fault condition.

With continued reference to FIG. 1, a safety lens 28 is positioned at the output 30 of the scanner 16. The safety lens 28 includes at least two optical powers (curvatures). One optical power is generally on an upper portion 32 (a top half, by way of example) of the safety lens 28, and another optical power is generally on a lower portion 34 (bottom half, by way of example) of the safety lens 28. The lower portion 34 of the safety lens 28 is intended to produce beams 36 with a higher divergence into the audience area 26 where an audience 38 will reside and thus, the optical power for the lower portion of the lens is greater than that of the upper portion 32. The upper portion 32 of the safety lens 28 is intended to produce beams 40 with low divergence in an area 42 above the audience 38.

Typical optical power for the lower portion 34 of the safety lens 28 is between −0.5 diopters and −3.0 diopters. The upper portion 32 of the safety lens 28 is intended to be scanned into the area 42 where the audience will not reside and in fact, where target mirrors (not shown) may reside. Therefore the optical power of the upper portion 32 of the safety lens 28 may be effectively nearly 0.0 diopters or possibly even slightly positive to aid in maintaining a desirably collimated projected and the scanned beam 44. Although these are typical diopter ranges, these numbers are not intended to be limiting.

One possible way of manufacturing the safety lens 28 may include providing a typical round lens with an optical power of −0.5 diopters and cutting it in half. Then providing a second lens with an optical power of −1.0 diopters and cutting it in half as well. The two half-lenses are then glued together in the middle with optical cement. The portion of the lens 28 with the higher optical power would be used on the bottom, and used to project beams into the audience. The optical powers and manufacturing technique described here is only intended to be illustrative, and not limiting.

If the technique above were used, this would indeed create a safety lens with two separate optical powers. This manufacturing technique results in a lens that includes an abrupt change in the beam divergence as it crosses the line 46 formed where the two lenses meet. There may be undesirable beam distortions that occur within such a sharp cutoff region.

Figure 2:
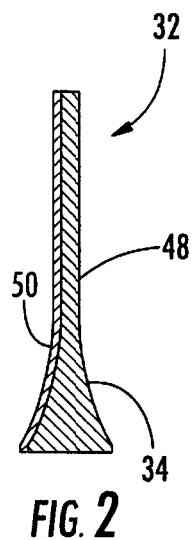
FIG. 2 is a cross sectional side view of one safety lens in keeping with the teachings of the present invention.

Therefore, one method of manufacturing the safety lens includes use of modern CNC machinery capable of producing curvatures of up to +/−18.0 diopters, and creates the safety lens out of a single piece of material, such as CR39, which is a very stable plastic monomer that can be easily machined and polished for optical applications. The manufacturing technique may provide an optical power on the upper portion 32 of the lens 28, as illustrated with reference to FIG. 2, and another optical power on the lower portion 34 of the lens, and a blended optical power at an intermediate portion 48 of the lens. Note that these curvature ranges, manufacturing techniques and material are meant only to be illustrative and not limiting.

As noted above, generally the lower portion 34 of the safety lens 28 will effectively have greater optical power than the upper portion 32 and there may be a gradual change in lens curvature between the upper portion and lower portion, thus avoiding distortion that would be caused by the beam crossing a sharp split between the two optical powers. It is also possible that there could be three optical powers, for example, one optical power for the upper portion of the scan field, a second optical power for the central portion of the scan field, and a third optical power for the lower portion of the scan field.

Within the embodiment illustrated with reference to the system 10, it is preferable that at least the lower portion 34 of the safety lens 28 be made with negative optical power, because a negative optical power will increase divergence at all points between the output of the safety lens and the audience. However, it is also possible to configure the safety lens 28 using a positive optical power, even in the lower portion 34. However, there will be a converging effect before the beam begins to diverge, again providing beams with higher divergence in the audience 38. Thus, positive optical powers can be used as long as the audience is located at a sufficient distance from the laser projector to ensure that they are beyond the point of convergence.

The safety lens 28 may additionally be coated with a multi-layer, reflection free coating 50 optimized for transmittance in the visible wavelengths.

The system 10 described above with reference to FIG. 1 provides a straight forward and thus desirable approach to create laser beam projection for safe audience scanning, because it places the safety lens 28 at the output 30 of the scanner 16, and no additional lenses or adjustments are needed.

Figure 3:
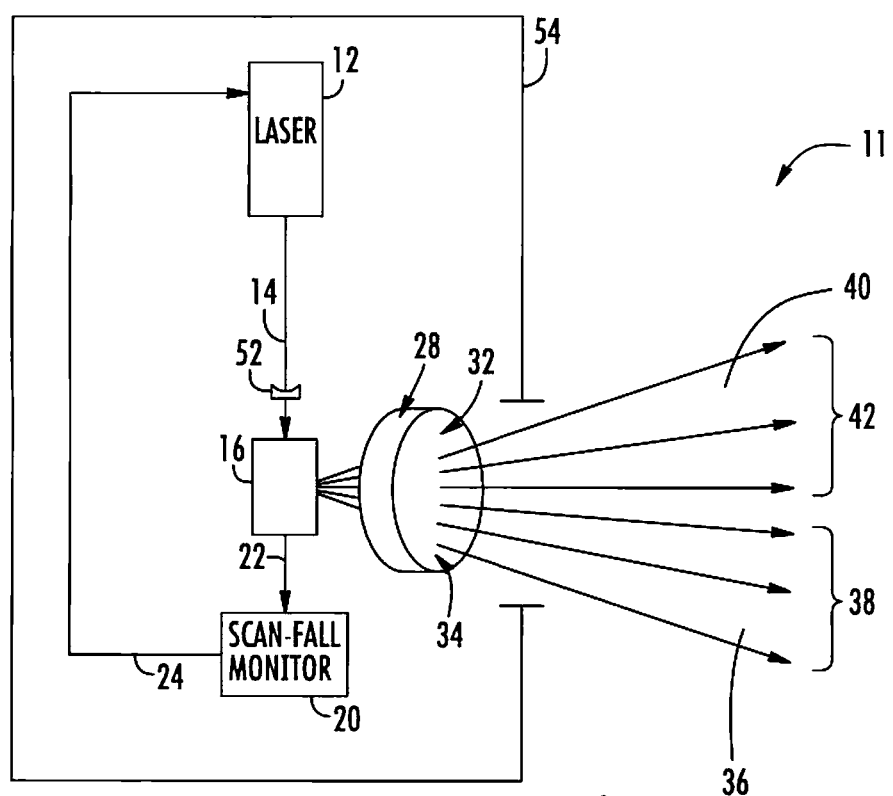
FIG. 3 is a diagrammatical illustration of a laser projection system for scanning an audience, according to an alternate embodiment of the present invention.

However, yet further desirable performance characteristics are achieved with the system 11 illustrated with reference to FIG. 3. For the system 11 herein described by way of example, the laser 12 produces the light beam 14 which is directed through a modifying lens 52 before being directed to the scanner 16. The scanner 16 includes one or more moving mirrors capable of scanning the laser beam along the X-Y coordinates, described earlier with reference to FIG. 1. The scan fail monitor 20 performs a calculation on the scanner output signal 22, which in turn outputs a fault signal 24 if the position and/or velocity of the scanner 16 would lead to a hazardous condition, such as the scanning action being too slow or stopping in the audience 38. The safety lens 28 is as earlier described with reference to FIG. 1.

Within the system 11, it is desirable for the lens 52 to be configured to provide a negative optical power of, for example −2.0 diopters. It is also desirable to configure the upper portion 32 of the safety lens 28 to have a positive optical power of, for example +2.1 diopters, thus beams with low divergence 42 will be projected above the audience 38. The upper portion 32 may be configured to provide completely collimated beams as long as the lens 52 is spaced appropriately from the scanner 16. In this configuration, the lens 52 having a negative optical power and the upper portion 32 of the safety lens 28 having a positive optical power that is greater than or equal to the negative power of lens 52 will form an up-collimator. An up-collimator reduces divergence even further when compared with that of the laser 12 itself. This is desirable for mirror targeting applications.

Up-collimators that comprise two lenses are known in the art, and are typically placed before the scanner. However, placing the single lens 52 before the scanner 16 and the safety lens 28, a second lens, after the scanner 16 provides a dual benefit. In this system 11, the moving mirror on the scanner 16 does not have to be as big as it would be in the case for well known up-collimator methods. Yet further, another benefit is provided by the lower portion 34 of safety lens 28.

Unlike the upper portion 32 of the safety lens 28, the lower portion 34 is configured with an optical power that does not quite collimate the light and in fact, within the system 11, the lower portion of the safety lens may provide no optical power at all, in which case it will provide beams with higher divergence into the audience 38 because of the optical power of the lens 52.

Since it may be desirable for the safety lens 28 to be located external to the components carried within a common housing 54 and more easily removable so that different optical powers may be used for different venues. However, it should be understood that there is added safety for the system above described when all components are within a common housing because the safety lens becomes an integral fail-safe component. By way of example for the system 11 above described, if the safety lens is removed, then high divergence beams may be projected everywhere because of the optical power of lens 52.

As noted above, within the system 11, it is preferable to have the lens 52 configured to provide a negative optical power, and at least the upper portion 32 of safety lens 28 configured to have a positive optical power. However, it is possible for modifying lens 52 to provide a positive optical power, and also possible to configure the safety lens 28 to provide negative optical power. Many lenses and optical configurations are possible and still remain within the scope of this invention as long as the beams with lower divergence 42 are directed above the heads of the audience 38 and the beams with greater divergence 38 directed into the audience 29.

It will be understood by those of skill in the art that embodiments of the present invention may be driven by a computer or other pattern generator, not herein described because such devices are common and well known to those of ordinary skill in the art.

Accordingly, within the drawings and specification, there have been disclosed typical preferred embodiments of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A laser projection system for audience scanning, the system comprising:

a laser for producing a beam of light;

a scanner operable with the laser for directing the light beam along X-Y vector coordinates so as to produce a scanned light beam;

a safety lens receiving the scanned light beam, wherein the safety lens includes at least two optical powers, and wherein one optical power projects the scanned light beam as a first beam with lower divergence than a second optical power thereof projecting the scanned light beam as a second beam with a greater divergence; and a scan-fail monitor operable with the scanner, the scan-fail monitor emitting a fault signal which reduces the beam of light coming from the laser to a level that would be safe during a fault condition;

wherein the safety lens is positioned at an output of the scanner such that the laser projection system is operable to direct the first beam with lower divergence and the second beam with greater divergence to respective first and second zones remote therefrom, the first zone being above a viewing audience area and the second zone being within the viewing audience area.

2. The system according to claim 1, further comprising a modifying lens receiving the light beam from the laser, the modifying lens modifying the light beam according to a preset optical power associated with the modifying lens so as to produce a modified light beam to be received by the scanner.

3. The system according to claim 2, wherein the modifying lens has a negative optical power and at least a portion of the safety lens has a positive optical power.

4. The laser projector recited in claim 1, wherein at least one portion of the safety lens has a negative optical power.

5. The system according to claim 1, wherein an effective optical power of the safety lens is about 0 diopters at a first portion thereof and the effective optical power of the safety lens is about negative 2 diopters at a second portion thereof.

6. The system according to claim 1, wherein the safety lens has a plurality of optical power regions separated by a sharp split.

7. The system according to claim 1, wherein the safety lens has a plurality of optical power regions blended together with a generally smooth transition between the optical power regions.

8. The system according to claim 1, wherein the scanner is an X-Y Galvanometer-based optical scanner.

9. A laser projection system for audience scanning, the system comprising:
a laser for producing a light beam;
a first lens which receives the light beam and modifies the light beam according to an optical power associated with the first lens, thus producing a modified light beam;
a scanner receiving the modified light beam and directing the modified light beam along X-Y vector coordinates so as to produce a modified and scanned light beam;
a safety lens associated with the modified and scanned light beam, wherein the safety lens includes at least two optical powers, and wherein one of the optical powers projects beams from the laser with low divergence above a viewing audience and projects beams from the laser with a greater divergence thereof into the viewing audience; and
a scan-fail monitor operably connected to the scanner, the scan-fail monitor emitting a fault signal which reduces the light beam coming from the laser to a level that would be safe during a fault condition.

10. The system according to claim 9, wherein the safety lens has a plurality of powers separated by a sharp split.

11. The system according to claim 9, wherein the safety lens has a plurality of powers blended together with a generally smooth transition between optical powers.

12. The system according to claim 9, wherein the scanner is an X-Y Galvanometer-based optical scanner.

13. The system according to claim 9, wherein an effective optical power of the safety lens is about 0 diopters at a top portion thereof and the effective optical power of the safety lens is about negative 2 diopters at a bottom portion thereof.

14. The system according to claim 9, wherein the first lens has a negative optical power and at least a portion of the safety lens has a positive optical power.

15. The system according to claim 9, wherein at least one portion of the safety lens has a negative optical power.

16. A laser projection system comprising:
a laser for producing a beam of light;
a scanner operable with the laser for producing a scanned light beam; and
a safety lens receiving the scanned light beam, wherein the safety lens includes at least two optical powers, and wherein one optical power projects the scanned light beam as a first beam with a lower divergence than a second optical power projecting the scanned light beam as a second beam having a greater divergence than the one optical power;
wherein the safety lens is positioned at an output of the scanner such that the laser projection system is operable to direct the first beam with lower divergence and the second beam with greater divergence to respective first and second zones remote therefrom, the first zone being above a viewing audience area and the second zone being within the viewing audience area.

17. The system according to claim 16, wherein the one optical power is more positive than the second optical power.

18. The system according to claim 16, further comprising a scan-fail monitor operable with the scanner for emitting a fault signal to the laser for reducing intensity of the beam of light coming from the laser to a level acceptable during a fault condition.

19. The system according to claim 16, wherein the scanner is an X-Y Galvanometer-based optical scanner directing the light beam along X-Y vector coordinates.

20. The system according to claim 16, further comprising a modifying lens receiving the light beam from the laser.

21. The system according to claim 20, wherein the modifying lens has a negative optical power and at least a portion of the safety lens has a positive optical power.

22. The system according to claim 16, wherein at least a portion of the safety lens has a negative optical power.

23. The system according to claim 16, wherein an effective optical power of the safety lens is about 0 diopters at a first portion thereof and the effective optical power of the safety lens is about negative 2 diopters at a second portion thereof.

24. The system according to claim 16, wherein the safety lens has a plurality of optical power regions separated by at least one of a sharp split and a generally smooth transition between the optical power regions.

* * * * *